(12) United States Patent
Kraus et al.

(10) Patent No.: US 7,941,892 B2
(45) Date of Patent: May 17, 2011

(54) WINDSHIELD WIPING DEVICE FOR A MOTOR VEHICLE

(75) Inventors: Achim Kraus, Buehl (DE); Jan Dietrich, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 1113 days.

(21) Appl. No.: 10/559,883

(22) PCT Filed: Apr. 27, 2004

(86) PCT No.: PCT/DE2004/000878
§ 371 (c)(1), (2), (4) Date: Dec. 7, 2005

(87) PCT Pub. No.: WO2005/000642
PCT Pub. Date: Jan. 6, 2005

(65) Prior Publication Data
US 2006/0123580 A1  Jun. 15, 2006

(30) Foreign Application Priority Data
Jun. 30, 2003 (DE) .................................. 103 29 568

(51) Int. Cl.
*B60S 1/06* (2006.01)
*B60S 1/24* (2006.01)

(52) U.S. Cl. ... 15/250.31; 15/250.3; 103/2; 103/DIG. 3; 384/295

(58) Field of Classification Search ................. 15/250.3, 15/250.31; 403/2, DIG. 3; 296/96.15, 96.17; 384/295, 296
See application file for complete search history.

(56) References Cited

U.S. PATENT DOCUMENTS

| 5,700,104 A | * | 12/1997 | Hehl et al. | 403/265 |
| 6,406,089 B1 | * | 6/2002 | Zimmer | 296/192 |
| 6,505,376 B1 | | 1/2003 | Kagawa | |
| 6,554,477 B1 | * | 4/2003 | Zimmer | 384/130 |
| 6,701,569 B1 | * | 3/2004 | Benner | 15/250.31 |
| 6,718,592 B2 | * | 4/2004 | Ohashi et al. | 15/250.31 |
| 6,793,396 B2 | * | 9/2004 | Zimmer | 384/247 |
| 2001/0011831 A1 | * | 8/2001 | Ohashi et al. | 296/96.17 |
| 2003/0077013 A1 | * | 4/2003 | Zimmer | 384/415 |

FOREIGN PATENT DOCUMENTS

| DE | 69600678 | 2/1999 |
| EP | 1291254 | 3/2003 |
| WO | WO 95/05959 | 3/1995 |
| WO | WO 02/42128 | 5/2002 |
| WO | 02/076797 | * 10/2002 |
| WO | WO 03/051690 | 6/2003 |

* cited by examiner

*Primary Examiner* — Gary K Graham
(74) *Attorney, Agent, or Firm* — Michael Best & Friedrich LLP

(57) ABSTRACT

Windshield wiper device for a motor vehicle with at least one molded tube (10) to accommodate a drive shaft to drive at least one wiper arm, wherein the at least one molded tube (10) can be attached to a holding element (11) that can be connected to the body, and to a stub (12) accommodating a mounting plate tube, and connecting bridges (14, 15) are provided to attach the at least one molded tube (10) to the holding element (11) and/or to the stub (12).

21 Claims, 2 Drawing Sheets

WINDSHIELD WIPING DEVICE FOR A MOTOR VEHICLE

BACKGROUND OF THE INVENTION

The invention relates to a windshield wiper device for a motor vehicle with at least one molded tube to accommodate a drive shaft to drive at least one wiper arm, wherein the at least one molded tube can be attached to a holding element that can be connected to the body, and to a stub accommodating a mounting plate tube.

Pedestrians are completely unprotected in collisions with vehicles. In particular, inflexible, hard parts under the engine hood frequently lead to severe injuries when a pedestrian impacts a vehicle. The windshield wiper device is located in an area where a pedestrian frequently impacts in the case of a collision with a vehicle. In order to minimize the risk of injury, vehicle manufacturers are required to maintain a minimum distance of 65 to 85 mm between the engine hood and the wiper drive. However, as a rule a drive shaft for the windshield wiper device projects out of the molded tube and normally has only a distance of 10 mm to the hood. In a collision, if the head of a pedestrian impacts the area of the molded tube, the engine hood is only able to deform relatively little in this area. Consequently, severe injuries to the pedestrian are to be expected. As a result, solutions are known from the state of the art in which the molded tube breaks due to an impact so that the risk of injury to the pedestrian is reduced.

DE 696 00 678 T2 describes a wiper device for a motor vehicle with a molded tube to which a holding element and stub are attached. The stub or the holding element features a notch at which the stub or holding element break in the case of an impact with a pedestrian. This proposed solution has the disadvantage, however, that a lot of material is present, particularly in the area of the attachment of the holding element and the stub to the molded tube. Although a break between the holding element and the molded tube or between the stub and the molded tube is striven for.

SUMMARY OF THE INVENTION

The object of the invention is improving a windshield wiper device of the type cited at the outset in such a way that in the future the attachment of the molded tube to the holding element and/or to the stub can be realized in a manner that saves more material.

The invention attains the imposed objective with a windshield wiper device for a motor vehicle with at least one molded tube to accommodate a drive shaft to drive at least one wiper arm, wherein the at least one molded tube can be attached to a holding element that can be connected to the body, and to a stub accommodating a mounting plate tube. According to the invention, the windshield wiper device is characterized in that connecting bridges are provided to attach the at least one molded tube to the holding element and/or to the stub. The connecting bridges are relatively thin and therefore material-saving parts. As a result, they serve to reduce weight and costs. The connecting bridges are structural elements that are simple to realize in terms of design, which, particularly in the case of a plastic design, can be realized in an economical manner in terms of the requirements imposed on them.

Despite this, they guarantee a reliable attachment of the molded tube to the holding element and to the stub. In addition, the connecting bridges can deform or break off in the case of a pedestrian impact with the engine hood in such a way that the molded tube is displaced in the direction of the impact force as a result of the impact. Therefore, the molded tube does not represent a risk of injury to the pedestrian. In addition to plastic, zinc and aluminum die casting in particular can be considered as construction materials.

In the case of a development of the invention, an impact force acting on the at least one molded tube and therefore on the connecting bridges can be strengthened by a lever arm design. Because of the lever arm design, the deforming or breaking off of the connecting bridges is guaranteed even in the case of small forces, thereby increasing the pedestrian's safety.

It is possible to design the lever arm design in such a way that the connecting bridges are subjected to tension and/or bending over their entire cross-section when the impact force acts on the molded tube. The connecting bridges are especially greatly stressed due to tension load and/or bending load. Consequently, the connecting bridges can be bent or broken from the tension and/or bending load even with low forces.

If the windshield wiper device features connecting bridges each of which has a different cross-section, the connecting bridges with the smallest cross-section will fail first and then the connecting bridges with the larger cross-section. As a result, the connecting bridges can break or bend in a sequence that is precisely defined in advance.

In a preferred embodiment of the invention, the connecting bridges can be arranged like elbow levers. As a result, the great stress can build up in the connecting bridges even with small deformation paths, whereby the weaker connecting bridges fail relatively quickly and thereby guarantee continued movement of the at least one molded tube out of the impact area.

The connecting bridges can also be equipped expediently with predetermined breaking points in order to also guarantee that the connecting bridges break in a secure way.

Furthermore, the invention includes a windshield wiper device for a motor vehicle with at least one molded tube to accommodate a drive shaft to drive at least one wiper arm, wherein the at least one molded tube can be attached to a holding element that can be, connected to the body, and, in accordance with the invention, the holding element features a cross-section reduction in the area of the attachment of the at least one molded tube to the holding element. Consequently, even with low stress the molded tube can be bent or broken together with the holding element to which it is attached via an impact in the area of the cross-section reduction.

So that the holding element is bent or breaks reliably in the area of the cross-section reduction even with low stress, the cross-section reduction can be arranged in the area of a maximum bending moment or a maximum tensile stress.

In addition, it is also possible to select the material thickness of the holding element in such a way that, without a reduction in the cross-section, the holding element bends away or breaks off together with the molded tube in the case of an impact.

BRIEF DESCRIPTION OF THE DRAWINGS

Exemplary embodiments will be explained in more detail in the following on the basis of the enclosed drawings.

In detail, the drawings show.

DETAILED DESCRIPTION

Figure 1:
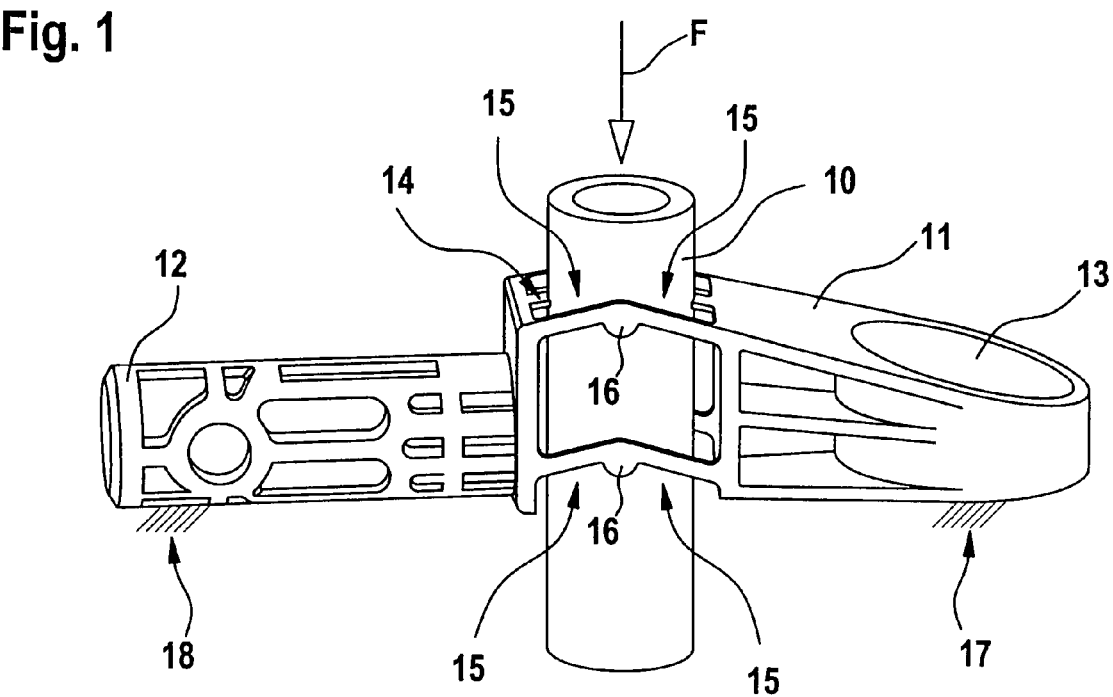
FIG. 1 A perspective view of a first attachment possibility of a molded tube with a holding element and a connection piece.

FIG. 1 shows a molded tube 10 into which a drive shaft (not shown here in more detail) to drive a wiper arm (also not shown here in more detail) can be inserted. A holding element 11 and a stub 12 are attached to the molded tube 10. The holding element 11 features a receptacle opening 13 into which the fastening means (not shown here) for fastening the holding element 11 to a body (also not shown here) can be introduced. A solid point of fixation 17 is created by the connection of the holding element 11 to the body. A mounting plate tube (also not shown) can be crimped onto the stub 12 so that the stub 12 features a solid point of fixation 18. The holding element 11 and the stub 12 are connected to the molded tube 10 via bridges 14 and 15. The bridges 15 each feature an elbow 16, which is connected to the molded tube 10. If a force F, e.g., an impact force in the case of the impact of a pedestrian, acts on the molded tube 10, the molded tube 10 then moves in the direction of force F as a result of force F and as a result of the reaction forces acting on the points of fixation 17 and 18, whereby the elbows 16 are also moved in the direction of force F. Due to the movement of the elbows 16, the connecting bridges 15 are distended so that the connecting bridges 14 thereby experience a great tension load and ultimately tear. The connecting bridges 15 also become overloaded because of the tearing of the connecting bridges 14. Finally, the connecting bridges 15 also tear as a result of the bending load acting on them so that the molded tube 10 yields to the impact in the direction of force F.

Figure 2:
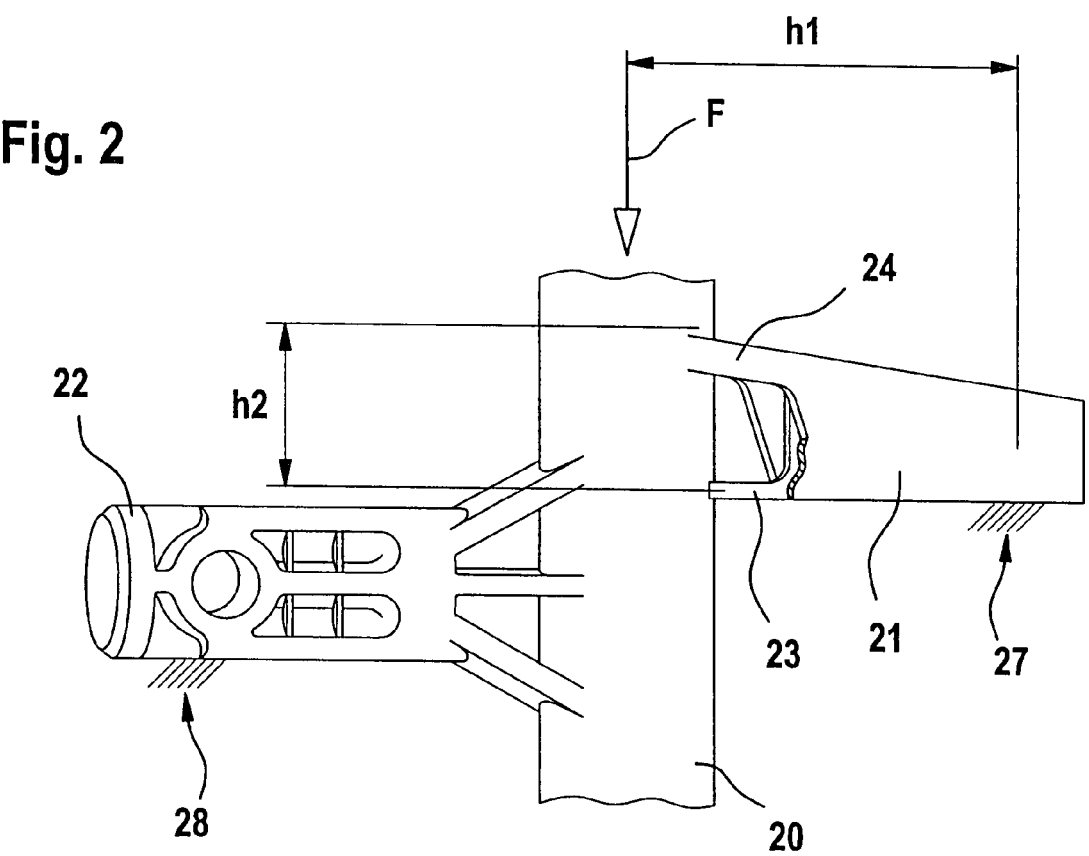
FIG. 2 A perspective view of a second attachment possibility of a molded tube with a holding element and a connection piece.

FIG. 2 shows a molded tube 20 onto which a holding element 21 and a stub 22 are attached. The holding element 21 can be fastened on a vehicle body (not shown in more detail) so that there is a solid point of fixation 27. The stub 22 can be crimped onto a mounting plate tube (also not shown) so that the stub 22 features a solid point of fixation 28. The holding element 21 is connected to the molded tube 20 via connecting bridges 23 and 24. If an impact force F acts on the molded tube 20, corresponding reaction forces act on the points of fixation 27 and 28. Because of the force F and the reaction forces opposing it, the connecting bridge 23, which has a smaller cross-section than connecting bridge 24, is subjected very heavily to tension so that it tears as result of this load. Connecting bridge 24 also ultimately breaks because of the overload so that the molded tube 20 yields to the impact in the direction of the force F. The force F acts with a lever arm $h_1$ with respect to point of fixation 27, while the tension force acting on the connecting bridge 23 acts with lever arm $h_2$. The greater $h_1$ is or the smaller $h_2$ is, the sooner the connecting bridge 23 tears. As a result, a precise dimensioning of lever arms $h_1$ and $h_2$ can determine the minimum required force necessary for the failure of the connecting bridge 23.

The invention claimed is:

1. Windshield wiper device for a motor vehicle with at least one molded tube (10, 20) to accommodate a drive shaft to drive at least one wiper arm, wherein the at least one molded tube (10, 20) is attached to a holding element (11, 21) that is connectable to a body, and to a stub (12, 22) accommodating a mounting plate tube, whereby at least first and second connecting bridges (14, 15, 23, 24) are provided to attach the at least one molded tube (10, 20) to at least one of the holding element (11, 21) and the stub (12, 22), whereby an impact force (F) acting on the at least one molded tube (10, 20) and therefore on the connecting bridges (14, 15, 23, 24) is strengthened by a lever arm design, whereby the first and second connecting bridges are formed so that the first connecting bridge tears first before the second connecting bridge tears as a result of the impact force, and wherein the second connecting bridges (15) form elbow levers, each defining an elbow secured to one side of the at least one tube with the respective connecting bridges extending therefrom substantially along the one side, the connecting bridges having a length thereof from a respective elbow to the attachment with the holding element or stub, a substantial portion of the length having an entire periphery free from contact with the tube, the holding element and the stub, the substantial portion of the length having a substantially uniform transverse cross-section.

2. Windshield wiper device according to claim 1, characterized in that the connecting bridges (14, 15, 23, 24) can be subjected to tension and/or bending over their entire cross-section via the impact force (F) acting on the lever arm design.

3. Windshield wiper device according to claim 2, characterized by connecting bridges (14, 15, 23, 24) each of which has a different cross-section.

4. Windshield wiper device according to claim 3, characterized in that the connecting bridges (14, 15, 23, 24) feature predetermined breaking points.

5. Windshield wiper device according to claim 1, characterized by connecting bridges (14, 15, 23, 24) each of which has a different cross-section.

6. Windshield wiper device according to claim 1, characterized in that the connecting bridges (14, 15, 23, 24) feature predetermined breaking points.

7. Windshield wiper device according to claim 1, wherein the connecting bridges attach the molded tube to the holding element.

8. Windshield wiper device according to claim 1, wherein the connecting bridges attach the molded tube to the stub.

9. Windshield wiper device according to claim 1, wherein the connecting bridges attach the molded tube to both the holding element and the stub.

10. Windshield wiper device according to claim 1, characterized in that the connecting bridges (14, 15, 23, 24) feature predetermined breaking points.

11. Windshield wiper device according to claim 1, wherein each of the connecting bridges includes an elbow connected to the tube.

12. Windshield wiper device according to claim 11, wherein each of the connecting bridges includes generally linear portions extending from the elbow, one of the generally linear portions being connected to the holding element and the other of the generally linear portions being connected to the stub, and the generally linear portions defining an obtuse angle having a vertex defined by the elbow.

13. Windshield wiper device for a motor vehicle with at least one molded tube to accommodate a drive shaft to drive at least one wiper arm, wherein the at least one molded tube is attached to a holding element that is connectable to the body, characterized in that the holding element features a cross-section reduction in the area of the attachment of the at least one molded tube to the holding element, whereby the molded tube is connected by at least first and second connecting bridges to the holding element, whereby the first and second connecting bridges are formed so that the first connecting bridge tears first before the second connecting bridge tears, and wherein the second connecting bridges (15) form elbow levers, each defining an elbow secured to one side of the at least one tube with the respective connecting bridges extending therefrom substantially along the one side, the connecting bridges having a length thereof from a respective elbow to the attachment with the holding element or stub, a substantial portion of the length having an entire periphery free from contact with the tube, the holding element and the stub, the substantial portion of the length having a substantially uniform transverse cross-section.

14. Windshield wiper device according to claim 13, characterized in that the cross-section reduction is located in the area of a maximum bending moment or a maximum tensile stress.

15. Windshield wiper device according to claim 13, wherein each of the connecting bridges includes an elbow connected to the tube.

16. Windshield wiper device according to claim 15, wherein each of the connecting bridges includes generally linear portions extending from the elbow, one of the generally linear portions being connected to the holding element and the other of the generally linear portions being configured to be connected to the stub, and the generally linear portions defining an obtuse angle having a vertex defined by the elbow.

17. A windshield wiper device for a motor vehicle with at least one molded tube for receiving a drive shaft adapted to drive at least one wiper arm, the molded tube being attached to a holding element that is connectable to a body, and the molded tube being attached to a stub connectable to a mounting plate tube, the molded tube being attached to the holding element and to the stub by first and second connecting bridges formed so that in the event of an impact force the first connecting bridge tears first before the second connecting bridge tears, wherein the impact force is strengthened by a lever arm design of a connecting lever, and wherein the connecting bridges are formed as elbow levers, each defining an elbow secured to one side of the at least one tube with the respective connecting bridges extending therefrom substantially along the one side, the connecting bridges having a length thereof from a respective elbow to the attachment with the holding element or stub, a substantial portion of the length having an entire periphery free from contact with the tube, the holding element and the stub, the substantial portion of the length having a substantially uniform transverse cross-section.

18. A windshield wiper device according to claim 17, wherein each of the connecting bridges has a different cross-section.

19. A windshield wiper device according to claim 17, wherein the connecting bridges have predetermined breaking points.

20. Windshield wiper device according to claim 17, wherein each of the connecting bridges includes an elbow connected to the tube.

21. Windshield wiper device according to claim 20, wherein each of the connecting bridges includes generally linear portions extending from the elbow, one of the generally linear portions being connected to the holding element and the other of the generally linear portions being connected to the stub, and the generally linear portions defining an obtuse angle having a vertex defined by the elbow.

\* \* \* \* \*